UNITED STATES PATENT OFFICE.

JOB MORTEN AUGUST STILLESEN, OF NIAGARA FALLS, NEW YORK.

LIME-NITROGEN PROCESS AND PRODUCT.

1,386,445.   Specification of Letters Patent.   Patented Aug. 2, 1921.

No Drawing. Application filed August 8, 1911, Serial No. 643,011. Renewed November 30, 1917. Serial No. 204,782.

*To all whom it may concern:*

Be it known that I, JOB MORTEN AUGUST STILLESEN, a subject of the King of Norway, residing at Niagara Falls, in the county of Niagara and State of New York, have invented certain new and useful Improvements in Lime-Nitrogen Processes and Products, of which the following is a full, clear, and exact specification.

This invention relates to preparation of lime nitrogen, and more particularly has reference to improvements in the process of producing lime nitrogen broadly described in my Patent No. 982,311, dated January 24, 1911. The present invention also comprises the product resulting from my process.

In further experimentation, I have discovered that the objectionable qualities given to lime nitrogen by the presence of free lime (CaO) therein are overcome equally as well for many purposes, if the free lime be only changed into basic carbonates of calcium, of which a number are known, such as $CaCO_3$. CaO or $2CaCO_3$.CaO, and that lime nitrogen containing basic carbonates of calcium will have a greater percentage of combined nitrogen per unit of weight than has heretofore been obtained.

It has been found that some soils require lime, while others do not, and it is therefore desirable, in the manufacture of lime nitrogen or analogous nitrogen bearing fertilizer materials, to be able to regulate at will the contents of free or combined lime. Thereby, it is possible, by my process of treating materials containing either free or hydrated lime, to obtain just the proper composition to secure the best results without injuring the soil. This is effected, according to the present invention, by combining the free lime, or water treated lime, or hydrated lime containing material, with carbon dioxid according to the basicity desired.

I have also discovered that by treating the lime containing material with water before treatment with carbon dioxid, the latter will be absorbed quicker, and thereby the cost of producing lime nitrogen containing either neutral or basic carbonates, or basic hydrated carbonates, considerably reduced.

The reaction which occurs in the neutralization of lime to basic or normal carbonates, with carbon dioxid, is an exothermic one, and can take place at low temperatures with the evolution of much heat. I have now discovered that it is advantageous, in treating the free or hydrated lime in lime nitrogen with carbon dioxid, to keep the temperature of the reaction as low as possible in order to prevent the temperature of the whole mass from rising too high, with consequent possible decomposition of the lime nitrogen. To prevent excessive heat in this exothermic reaction, I propose to employ liquid or solid carbon dioxid gas, or carbon dioxid gas under expansion, whereby the heat liberated by the reaction of carbon dioxid and lime will be absorbed by the expansion of the carbon dioxid, and the temperature of the entire process thereby maintained as low as desired.

I have further discovered that one or the other of several basic carbonates are formed in treating lime with carbon dioxid, in proportion as the gas is absorbed, that is, the process is a progressive one provided the supply of gas be maintained, normal carbonate being produced successively after the basic carbonates and after prolonged treatment with the right proportion of carbon dioxid.

My invention therefore contemplates a process for producing lime nitrogen containing basic carbonates by treatment with a deficiency of carbon dioxid, and the production of lime nitrogen containing normal carbonate by treatment with an excess of carbon dioxid, whereby the time required is shortened, the cost of production decreased and products containing an increased precentage of fixed nitrogen obtained.

The invention also comprehends a product consisting of lime nitrogen and one or more basic carbonates of calcium, with or without normal carbonates.

The process of obtaining lime nitrogen is substantially the same as that described in the patent above referred to, wherein calcium carbid is treated with nitrogen, in the usual manner. Such product contains a considerable percentage of free lime, formed in the manufacture of the carbid, and I will now describe specifically the process whereby I produce one or the other or all of the basic calcium carbonates above referred to or normal carbonate, directly from the free lime containing material by treatment with solid or liquid carbon dioxid, or with carbon dioxid gas under expansion.

According to one part of my invention, I propose to treat the free lime containing material, such for example as lime nitrogen, with a deficiency of carbon dioxid until the first basic calcium carbonate (CaCO$_3$.CaO) is formed, then by further treatment this basic carbonate takes up more carbon dioxid and goes over to a second basic carbonate (2CaCO$_3$.CaO), then to a third (3CaCO$_3$.CaO), etc. While each of these compounds contains lime (CaO) in combination, I have found that the injurious effect of the latter in its free state is reduced in the basic compounds, and that the resultant lime nitrogen containing a basic carbonate can be used with the same advantages as are attained by the normal carbonate, depending upon the particular requirements.

I have also found it advantageous in carrying out my invention to first treat the mixture of lime nitrogen and lime, as received from the lime nitrogen furnace, with water, or with water sufficient to slake the free lime present, whereby some or all of the lime may become hydrated according to the reaction:

When the water treated mixture of lime nitrogen and lime is treated at a temperature below that of dissociation of calcium carbonate (850°–900° C.) with carbon dioxid in a condition of expansion, whether gas, liquid or solid, normal or basic carbonate of calcium and water will be formed, or basic hydrated calcium carbonates may be formed according to the reaction:

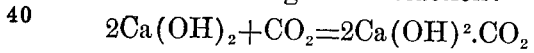

or the water may be evaporated by the heat of the reaction:

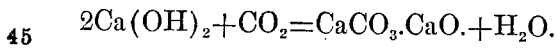

The proportion of carbon dioxid to lime may vary from about 40% for the first basic carbonate, to about 60% for the second carbonate, to about 80% or more for the normal carbonate, for ordinary raw lime nitrogen. To obtain basic hydrated carbonates more water will be required, but it is not possible to give any precise proportions of either carbon dioxid or water for a given result, because the character and composition of the raw materials which can be treated vary so greatly.

In this specification where I refer to basic carbonates of calcium, I intend to cover either or all of these carbonates of calcium, whether hydrated or not, other than the normal carbonate (CaCO$_3$).

The last feature of my improvements comprises specifically the treatment of a lime containing material, such as lime nitrogen with or without water being present, with solid or liquid carbon dioxid or with carbon dioxid gas under expansion, either to produce basic, or basic hydrated or normal carbonate of calcium. Carbon dioxid is a gas at ordinary temperatures but when cooled to 17° C., and subjected to a pressure of about 54 atmospheres, it liquefies. When the liquid is released from pressure, it evaporates at ordinary temperature, as does the solidified gas, which can be produced for instance, by pouring the liquid from one vessel into another. The evaporation of a part of the liquid while being poured absorbs so much heat that the remaining portion solidifies into a white snow, which slowly expands in the air. According to my process, I propose to mechanically mix or to have the free lime containing material, such as lime nitrogen, come into contact with liquid or solid carbon dioxid, or with carbon dioxid gas under expansion, and the reaction immediately commences, the heat or part of the heat given off by the reaction being absorbed by the expansion of the carbon dioxid, and thereby the resultant temperature of the mass is maintained at the desired degree, or low enough so that there will be no loss of nitrogen or ammonia.

While I have specifically referred to the treatment of lime nitrogen containing free lime, I do not wish to be understood as limiting myself hereto, since my discoveries are valuable and useful wherever it is desired to remove free lime as an impurity from compositions or a caustic oxid which will combine with CO$_2$ from such materials as would be injured by excessive heat, as other nitrogen compounds of calcium and analogous metals.

What is claimed, is:

1. The process which consists in treating lime containing material with carbon dioxid in a condition of simultaneous expansion and cooling.

2. The process which consists in treating lime containing material with condensed carbon dioxid.

3. The process which consists in treating moistened lime containing material with carbon dioxid in a condition of simultaneous expansion and cooling.

4. The process which consists in treating moistened lime containing material with condensed carbon dioxid.

5. The process which consists in treating lime nitrogen with water and with carbon dioxid.

6. The process which consists in treating lime nitrogen with water and with carbon dioxid in a condition of simultaneous expansion and cooling.

7. In the process of modifying lime in a nitrogen carbon compound, the step which consists in adding condensed carbon dioxid and permitting it to expand in intimate relation therewith.

8. The process of neutralizing lime nitrogen consisting in moistening and treating with condensed carbon dioxid.

9. The process of neutralizing lime nitrogen consisting in moistening and treating with condensed carbon dioxid in such manner as to produce basic carbonate of calcium.

10. The process of neutralizing lime nitrogen consisting in moistening and then treating with a proportion of condensed carbon dioxid such as to produce a predetermined basic carbonate of calcium.

11. The process of neutralizing lime nitrogen consisting in moistening and then treating with a proportion of condensed carbon dioxid such as to produce a predetermined carbonate of calcium.

12. The process which consists in treating a lime containing material with water and carbon dioxid in such manner as to form basic carbonate of calcium.

13. The process which consists in treating a lime containing material with carbon dioxid at or below its temperature of evaporation.

14. The process which consists in treating lime nitrogen and lime composition with carbon dioxid at or below its temperature of evaporation.

15. The process which consists in treating a lime and lime nitrogen composition with expanding carbon dioxid at a temperature materially below 60° C.

16. The process which consists in treating lime nitrogen with water and a gas in a condition of simultaneous expansion and cooling to maintain the temperature below that of decomposition of lime nitrogen.

17. The process of controlling the temperature of the reaction of carbon dioxid and an alkaline earth oxid consisting in expanding condensed carbon dioxid mixed with the alkaline earth oxid.

18. The process of producing a predetermined carbonate of an alkaline earth metal consisting in expanding condensed carbon dioxid mixed in predetermined proportion with the alkaline earth oxid of said metal.

19. A composition of matter comprising lime nitrogen and basic carbonate of calcium.

20. A composition of matter comprising lime nitrogen and a plurality of basic carbonates of calcium.

21. A composition of matter comprising lime nitrogen, normal carbonate of calcium, and a basic carbonate of calcium.

22. A composition of matter comprising lime nitrogen and such carbonate of calcium as is formed by the combination of lime with carbon dioxid in a condition of simultaneous expansion and cooling.

In testimony whereof I affix my signature, in presence of two witnesses.

JOB MORTEN AUGUST STILLESEN.

Witnesses:
E. M. BENNETT,
RUTH E. ELSHEIMER.